UNITED STATES PATENT OFFICE.

P. S. DEVLAN, OF JERSEY CITY, NEW JERSEY.

IMPROVED COMPOSITION FOR LINING JOURNAL-BOXES.

Specification forming part of Letters Patent No. 51,701, dated December 26, 1865.

*To all whom it may concern:*

Be it known that I, PATRICK S. DEVLAN, of Jersey City, county of Hudson, and State of New Jersey, have invented a new and Improved Composition for Lining Journal-Boxes and other Rubbing-Surfaces; and I do hereby declare that the following is a full, clear, and exact description thereof.

My said invention consists of a compound of silicate of soda or potash, fibrous substance, plumbago, and soapstone, to be used as a lining for journal-boxes and other rubbing-surfaces, to prevent the heating of such surfaces and reduce friction.

The mode of preparing and applying the said compound which I have practiced with success is as follows, viz: I take one pound of silicate of soda or potassa, one pound of vegetable fiber, properly reduced, and by preference in the state of pulp suitable for making paper, a quarter of a pound of plumbago, (graphite,) and one-eighth of a pound of soapstone, the two latter ingredients in the pulverized state, and I thoroughly mix them and bring the compound to a plastic state.

The compound thus prepared is to be applied to the inner surface of journal-boxes and other rubbing-surfaces to form a lining to such surfaces, and there compressed and dried.

I have found it best to form the boxes and other rubbing-surfaces with cavities to receive the composition in the plastic state, which, on the application of pressure to it, will spread over the entire or any desired portion of the surfaces. This mode of lining boxes has been practiced successfully with other compositions, and therefore does not require to be particularly described.

It will be found on trial that the lining of boxes and other rubbing-surfaces with this compound will prevent heating and greatly reduce friction.

Although I have above given the proportions of the ingredients with which I have produced the best results, I do not wish to be understood as limiting my claim of invention to the said proportions.

What I claim as my invention, and desire to secure by Letters Patent as a lining for journal-boxes and other rubbing-surfaces, is—

The compound, substantially as described, consisting of silicate of soda or potash, vegetable fiber, plumbago, and soapstone, as set forth.

P. S. DEVLAN.

Witnesses:
    ANDREW DE LACY,
    WM. H. BISHOP.